(12) United States Patent
Held et al.

(10) Patent No.: US 7,735,989 B2
(45) Date of Patent: Jun. 15, 2010

(54) CURABLE INKJET INK

(75) Inventors: Robert Paul Held, Newark, DE (US); Nathaniel Reed Schwartz, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 699 days.

(21) Appl. No.: 11/637,491

(22) Filed: Dec. 12, 2006

(65) Prior Publication Data

US 2007/0139502 A1    Jun. 21, 2007

Related U.S. Application Data

(60) Provisional application No. 60/750,732, filed on Dec. 15, 2005.

(51) Int. Cl.
*G01D 11/00* (2006.01)

(52) U.S. Cl. .................. 347/100; 347/102; 347/95; 523/160

(58) Field of Classification Search ............. 347/100, 347/95, 96, 101, 102; 106/31.6, 31.13, 31.27; 523/160
See application file for complete search history.

(56) References Cited

U.S. PATENT DOCUMENTS

| 6,593,390 | B1 | 7/2003 | Johnson et al. |
| 6,685,311 | B2 | 2/2004 | Ishikawa et al. |
| 6,913,352 | B2 | 7/2005 | Yoshihiro et al. |
| 7,365,105 | B2 * | 4/2008 | Kiefer-Liptak .............. 522/121 |
| 2004/0021753 | A1 * | 2/2004 | Yoshihiro et al. ........... 347/100 |
| 2005/0159501 | A1 | 7/2005 | Kiefer-Liptak |
| 2005/0249895 | A1 | 11/2005 | Sisler et al. |

FOREIGN PATENT DOCUMENTS

| WO | WO 02/061001 A1 | 8/2002 |
| WO | WO 2005/030879 A2 | 4/2005 |
| WO | WO 2005/030881 A2 | 4/2005 |
| WO | WO 2005/047405 A1 | 5/2005 |
| WO | WO 2005/061634 A1 | 7/2005 |

OTHER PUBLICATIONS

PCT International Search Report and Written Opinion for International Application No. PCT/US2006/047985 dated Apr. 14, 2007.

* cited by examiner

*Primary Examiner*—Manish S Shah
(74) *Attorney, Agent, or Firm*—Angela J Grayson; Simon L. Xu

(57) ABSTRACT

The present invention pertains to a radiation-curable inkjet ink and, more particularly, to a radiation-curable inkjet ink comprising a specified polymerizable vehicle that is curable on exposure to radiation such as ultraviolet light.

12 Claims, No Drawings

CURABLE INKJET INK

CROSS-REFERENCE TO RELATED APPLICATION

This application claims priority under 35 U.S.C. §119 from U.S. Provisional Application Ser. No. 60/750,732, filed Dec. 15, 2005.

BACKGROUND OF THE INVENTION

The present invention pertains to a radiation-curable inkjet ink and, more particularly, to a radiation-curable inkjet ink comprising a specified polymerizable vehicle that is curable on exposure to radiation such as ultraviolet light.

Inkjet imaging techniques have become very popular in commercial and consumer applications. Ink jet printers operate by ejecting ink onto a receiving substrate in controlled patterns of closely spaced ink droplets. By selectively regulating the pattern of ink droplets, ink jet printers can produce a wide variety of printed features, including text, graphics, images, holograms and the like. Moreover, ink jet printers are capable of forming printed features on a wide variety of substrates, as well as three-dimensional objects in applications such as rapid prototyping.

Inkjet inks must meet stringent performance requirements in order for the inks to be appropriately jettable and for the resultant printed features to have the desired mechanical, chemical, visual and durability characteristics. In particular, inks must have relatively low viscosity when jetted, yet must be able to form accurate, durable images on the desired receiving substrate. For example, a typical ink will have a viscosity in the range of 3 to 30 centipoise at the jetting temperature. The low viscosity, however, poses a substantial challenge to achieving printed features with good mechanical and durability characteristics.

Aqueous based inks, although very successful in the home and small office market, have certain drawbacks in other applications. For example, in industrial printing, the substrate is typically nonporous and the aqueous ink must be dried, which is equipment intensive and time consuming. Also, the printed material needs to be handled carefully during the relatively lengthy drying period. Water-based inks are also compatible only with a limited range of substrates, and images formed using water-based inks typically require a protective overlaminate for outdoor applications.

Solvent-based inks, which are most commonly used in industrial applications, contain relatively volatile organic solvents. These inks dry more readily than aqueous inks and tend to be somewhat more durable in outdoor applications. However, the solvents require careful handling and may be toxic and/or flammable. These inks also tend to be compatible with only a limited range of substrates.

To avoid using conventional solvents, inks with polymerizable diluent have been developed. The diluent generally comprises one or more reactive monomers that are polymerized by exposure to radiation (radiation curable) such as ultraviolet light, electron beam energy and the like. The cured diluent forms a polymer film that provides durability to the print and requires no drying. The diluent mixture, which is also the ink vehicle, is chosen to provide appropriate ink viscosity. The reactive monomer content in the diluent also impacts the physical properties of the printed image (durability, flexibility, elasticity, gloss, hardness, chemical resistance, stiffness and so forth) and is optimized to achieve the desired properties.

Many of the polymerizable monomers have problems with regard to skin and/or eye irritation, and many of the monomers having low irritation cause undesirable cured properties such as poor weatherability in outdoor applications. Preferably, curable inks are comprised of polymerizable monomers with low irritation and, even more preferably, also provide good as-cured properties.

Atmospheric oxygen can inhibit polymerization of curable inks, reducing the quality and speed of curing. Oxygen inhibition can be avoided by curing materials in an inert atmosphere, but this is generally impractical. It is desirable to provide ink jet inks that cure rapidly in ambient conditions with little or no sensitivity to atmospheric oxygen.

Inkjet inks must possess proper dot gain in order to form images with attractive appearance. Dot gain refers to the degree to which an ink jetted drop spreads out upon application to a substrate. If an ink jetted drop spreads out too much on the substrate, then poor edge definition and intercolor bleed is observed. On the other hand, if an ink jetted drop spreads insufficiently upon application to the substrate, poor color density results. Dot gain characteristics depend upon a number of factors including the ink jet composition, the nature of the substrate, the substrate temperature, and the interfacial tension between the ink and the substrate. Many of the currently available radiation curable inks show favorable dot gain characteristics on some substrates, but not on others. Preferably a curable inkjet ink would be formulated to provide good dot gain characteristics and good appearance on a broad range of substrates.

Radiation curable inkjet inks with polymerizable diluent are disclosed, for example, in WO02/061001, WO05/030881, U.S. Pat. No. 6,685,311 and U.S. Pat. No. 6,913,352.

Radiation curable inkjet inks with a polymerizable silicone derivative as part of the polymerizable diluent are disclosed, for example, in U.S. Pat. No. 6,593,390 and WO05/047405. The polymerizable silicone derivative, such as silicone acrylate, can modify the surface tension of the ink.

An ink-jettable, radiation-curable overprint composition is disclosed in US2005/0249895. The composition comprises a polymerizable diluent and a surfactant, such as a polyether modified polydimethylsiloxane or a fluorosurfactant, to reduce the surface tension.

A radiation curable inkjet ink free of unreactive volatile organic compounds comprising polymerizable diluent and poly(alkylene oxide) modified poly(dimethyl siloxane) surfactant is disclosed in WO05/030879.

All of the above-referenced disclosures are incorporated by reference herein for all purposes as if fully set forth.

It is, therefore, desirable to provide radiation curable inks with improved characteristics, such as image durability and/or cure speed, and that are also suitable for use on a broad range of substrate types.

SUMMARY OF THE INVENTION

In one aspect the present invention pertains to a radiation curable inkjet ink composition comprising a polymerizable vehicle and at least one additional ingredient selected from the group of consisting of a colorant, a photosensitizer, a photosynergist, a photoinitiator and a surfactant, wherein said polymerizable vehicle comprises a mixture of monofunctional and multifunctional monomers comprising:

a linear alkyl acrylate selected from group consisting of n-octyl acrylate, n-nonyl acrylate, n-decyl acrylate and combinations thereof, preferably in an amount of between about 10% and about 18% by weight based on the total weight of the ink;

an ethoxylated 1,6-hexanediol diacrylate, preferably in an amount of between about 55% and about 67% by weight based on the total weight of the ink; and a propoxylated trimethylolpropane triacrylate, preferably in an amount of between about 7% and 13% by weight based on the total weight of the ink.

In one embodiment, the inventive ink further comprises (all three of) a photosensitizer, a photosynergist and a photoinitiator. A preferred photosensitizer is isopropyl thioxanthone. A preferred photosynergist is ethyl-4-(dimethylamino)benzoate. Preferred photoinitiators included either one or both of 2-methyl-1-[4-methylthio)phenyl]-2-(4-morpholinyl)-1-propanone and/or 2-benzyl-2-(dimethylamino)-1-[4-(4-morpholinyl)phenyl]-1-butanone.

In another embodiment, the inventive ink further comprises a surfactant. A preferred surfactant is a mixture of at least one fluorinated surfactant and at least one acetylenic diol surfactant.

The colorant, when present, is preferably a pigment stably dispersed in the polymerizable vehicle.

In another aspect, the present invention pertains to a method for ink jet printing, comprising the steps of:

(a) providing an ink jet printer that is responsive to digital data signals;

(b) loading the printer with a substrate to be printed;

(c) loading the printer with a radiation curable inkjet ink as set forth above;

(d) printing an image onto the substrate using said inkjet ink, in response to the digital data signals, and forming thereby a printed article; and (e) curing the image on the printed article.

In one embodiment, the curing step comprises the step of exposing the printed article to a radiation suitable for curing the ink printed thereon. The radiation is preferably ultraviolet light.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Polymerizable Vehicle

"Vehicle" is a general term to refer to the liquid medium, or carrier, for the colorant and/or any additives present in an ink. A "polymerizable" vehicle is a vehicle comprised of reactive liquid components (diluents) that can be polymerized to form a polymer film. Herein the term diluent is often used in place of vehicle to emphasize the difference between a reactive vehicle/diluent and the more traditional nonreactive aqueous- and solvent-based vehicles.

The vehicle for the inventive inks comprises a linear alkyl acrylate selected from n-octyl acrylate, n-nonyl acrylate, n-decyl acrylate and any combination thereof. In a preferred embodiment, the linear alkyl acrylate is a mixture of n-octyl acrylate and n-decyl acrylate.

The inventive vehicle further comprises an ethoxylated 1,6-hexanediol diacrylate, such as depicted by the following formula:

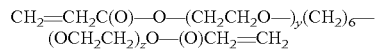

wherein y and z are integers. Preferably, the moles of ethoxylation (y+z) per molecule is on average between about one and about three, and more preferably on average about two.

The inventive vehicle further comprises a propoxylated trimethylolpropane triacrylate, such as depicted by the following formula:

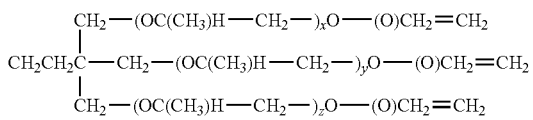

wherein x, y and z are integers. Preferably, the moles of propoxylation (x+y+z) per molecule is on average between about two and about four, and more preferably on average about three.

The vehicle may optionally comprise other reactive liquid components including monofunctional and multifuntional (di-, tri- or higher-functional) monomers. By mono-, di-, tri- and higher-functional monomers is meant compounds having, respectively, one, two, three or more functional groups (such as unsaturated carbon-carbon and/or epoxy) which are polymerizable by radiation, especially (but not exclusively) ultraviolet light.

Monofunctional polymerizable monomers include, for example, styrene, alpha-methylstyrene, substituted styrene, vinyl esters, vinyl ethers, N-vinyl-2-pyrrolidone, (meth)acrylamide, N-substituted (meth)acrylamide, nonylphenol ethoxylate (meth)acrylate, 2-(2-ethoxyethoxy)ethyl(meth) acrylate, β-carboxyethyl(meth)acrylate, cycloaliphatic epoxide, α-epoxide, 2-hydroxyethyl(meth)acrylate, (meth) acrylonitrile, maleic anhydride, itaconic acid, methyl(meth) acrylate, (meth)acrylic acid, octyl(meth)acrylate, isononyl (meth)acrylate, 2-ethylhexyl (meth)acrylate, lauryl(meth) acrylate, isobutyl(meth)acrylate, isodecyl (meth)acrylate, dodecyl(meth)acrylate, n-butyl(meth)acrylate, hexyl (meth) acrylate, isooctyl(meth)acrylate, isobornyl(meth)acrylate, N-vinylcaprolactam, stearyl(meth)acrylate, hydroxy functional caprolactone ester, hydroxyethyl(meth)acrylate, hydroxymethyl(meth)acrylate, hydroxypropyl (meth)acrylate, hydroxyisopropyl(meth)acrylate, hydroxybutyl(meth) acrylate, hydroxyisobutyl(meth)acrylate, tetrahydrofurfuryl (meth)acrylate, combinations of these, and the like. The use of "(meth)acrylate" is intended to refer both to "acrylate" and "methacrylate".

Multifunctional monomers include, for example, pentaerythritol triacrylate, hexanediol diacrylate, dipropyleneglycol diacrylate, tri(propylene glycol) triacrylate, neopentylglycol diacrylate, bis(pentaerythritol) hexa-acrylate, and the acrylate esters of ethoxylated or propoxylated glycols and polyols, for example, propoxylated neopentyl glycol diacrylate and ethoxylated trimethylolpropane triacrylate. Also included are: triethylene glycol divinyl ether, diethylene glycol divinyl ether, 1,4-cyclohexanedimethanol divinyl ether and ethylene glycol monovinyl ether.

Inks comprising the prescribed vehicle may be cured (polymerized) by any suitable form of electromagnetic radiation, including electron beam, visible light and/or, more preferably, ultraviolet light. The mixture of polymerizable vehicle components achieves a balance of desirable performance criteria such as low viscosity, fast cure speed and durable, flexible cured films. The vehicle is also advantageous from the standpoint of low skin and eye irritation.

Typically, the total of all mono-functional and multi-functional polymerizable monomers amounts to at least about 65% by weight of the total weight of ink.

The prescribed vehicle requires no additional solvent and, preferably, any nonpolymerizable diluent is avoided (substantially free of nonpolymerizable solvents). However, the presence of some solvent can be tolerated, and may be present incidentally through use of certain additives that are less than 100% active. In one embodiment, nonpolymerizable diluent (organic solvent) is less than about 3%, preferably less than about 1%, of the formulation by weight, based on the total weight of ink.

Colorant

Colored inks comprise one or more colorants. The colorant can be any suitable colorant but, from the standpoint of resistance to fade in outdoor applications, pigment colorants are preferred.

Pigments by definition are substantially insoluble in the vehicle and, in order to be used, must be stabilized to dispersion. Pigments can be stabilized to dispersion by separate dispersing agents, such as polymeric dispersants or surfactants. Alternatively, a pigment surface can be modified to chemically attach dispersibility-imparting groups and thereby form a so-called "self-dispersible" or "self-dispersing" pigment (hereafter "SDP(s)") which is stable to dispersion without separate dispersant. "Stably dispersed" means that the pigment particles are uniformly distributed and reasonably resistant to settling, flocculation and particle growth (ripening) under normal use conditions.

For dispersant-stabilized pigment dispersions, the choice and amount of dispersant will generally depend upon the nature and concentration of the pigment, and composition of the diluent. Examples of suitable materials may be found among dispersants sold under the trade names of Solsperse™ (Noveon), EFKA and BYK® (Byk Chemie). Mixtures of dispersants and mixtures of one or more dispersants with one or more dispersant synergists may be employed. Detailed teaching of pigment milling and millbase let down can be found, for example, in *Paint Flow and Pigment Dispersion*, Temple C. Patton, Wiley Interscience 1979 (ISBN #0-471-03272).

Pigments useful in the invention may be organic or inorganic. Suitable inorganic pigments include carbon black and titania ($TiO_2$), while suitable organic pigments include phthalocyanines, anthraquinones, perylenes, carbazoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides and anthrapyrimidines.

Useful organic pigments include those described in *The Colour Index*, Vols. 1-8, Society of Dyers and Colourists, Yorkshire, England. Nonlimiting examples included those having the following designations: Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24 and Pigment Blue 60; Pigment Brown 5, Pigment Brown 23 and Pigment Brown 25; Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 128, Pigment Yellow 129, Pigment Yellow 138, Pigment Yellow 139, Pigment Yellow 150, Pigment Yellow 151, Pigment Yellow 154, Pigment Yellow 155, Pigment Yellow 156 and Pigment Yellow 175; Pigment Green 1, Pigment Green 7, Pigment Green 10 and Pigment Green 36; Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60 and Pigment Orange 61; Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207 and Pigment Red 224; Pigment Violet 19, Pigment Violet 23, Pigment Violet 37, Pigment Violet 32 and Pigment Violet 42; and Pigment Black 6 and Pigment Black 7.

Mixtures of colorants may be employed, if desired, including mixtures of dyes, mixtures of pigments, and mixtures of one or more dyes with one or more pigments.

Preferred pigments include Pigment Blue 15:3, Pigment Blue 15:4, Pigment. Yellow 155, Pigment Red 122, and a complex of Pigment Red 202 and Pigment Violet 19.

Useful pigment particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Other Components

Additives (components other than vehicle and colorant) may be present in the ink to improve the properties or performance. Additives include, for example, surfactants, defoamers, photoinitiators, photosynergists, stabilizers against deterioration by heat or light, deodorants, flow or slip aids, biocides and identifying tracers.

The radiation curable inks of the present invention preferably include photoinitators, photosynergists and photosensitizers.

Examples of radical photoinitiators include 2,2-dimethyl-2-hydroxy-acetophenone; 1-hydroxy-1-cyclohexyl-phenyl ketone; 2,2-dimethoxy-2-phenylacetophenone; 2,4,6-trimethylbenzyl-diphenyl-phosphine oxide; Benzophenone; blends of bis(2,6-dimethoxybenzoyl)-2,4,4-trimethyl pentyl phosphine oxide and 1-phenyl-2-hydroxy-2-methyl propanone; blends of bis(2,6-dimethoxybenzoyl)-2,4,4-trimethyl pentyl phosphine oxide and 1-hydroxycyclohexyl-phenyl ketone; bis(2,4,6-trimethylbenzoyl)phenylphosphine oxide; and camphorquinone. Examples of cationic photoinitiators include iodonium and sulfonium salts. Preferred photoinitators include 2-benzyl-2-dimethylamino-1-(4-morpholinophenyl)-butan 1-one, and/or 2-methyl-1-(4-(methylthio)phenyl)-2-morpholino-propan-1-one.

Examples of photoactivators and photosynergists include ethyl-4-(dimethylamino)benzoate, N-methyldiethanolamine and 2-ethylhexyidimethylaminobenzoate. Such materials will generally be required only for free-radical curing.

1-chloro-4-propoxythioxanthone and isopropyl thioxanthone (mixture of 2- and 4-isomers) have been used as sensitizers for α-amino acetophenones.

In some embodiments, a radiation curable inkjet ink of the present invention will comprise a surfactant and, more preferably, a surfactant mixture comprising a fluorosurfactant and an acetylenic diol surfactant.

Fluorinated surfactants include surfactants represented by the following formula:

wherein R(f) is a perfluoroalkyl group having 6 to 22 carbon atoms, Q is a divalent bridging group, A is a water-soluble group, and n is 1 or 2.

The bridging Q group may be a diradical of an alkyl, aryl or alkylaryl group containing less than 10 carbon atoms, and may contain heteroatoms such as S, O and N. The linkage between the bridging Q group and the A group may be ether, ester, amide or sulfoamido, provided it is stable under the conditions of use.

The A group may be selected, for example, from —(OCH$_2$CH$_2$)$_x$OH, wherein x is 1 to 12; —COOM and —SO$_3$M, wherein M is hydrogen, ammonium, amine or an alkali metal such as lithium, sodium or potassium; —PO$_4$(Z)$_y$, wherein y is 1-2 and Z is hydrogen, ammonium, amine or an alkali metal such as lithium, sodium or potassium; —NR$_3$X, wherein R$_3$ is an alkyl group of 1 to 4 carbon atoms and X is an anionic counterion selected from the group consisting of halides, acetates, sulfonates and zwitterionic groups. Preferably, the A group is an ethylene oxide group of no greater than 8 to 9 monomer units.

Suitable fluorinated surfactants include those available from E. I. du Pont de Nemours and Company (Wilmington, Del.) under the tradename Zonyl®, and from 3M Company (Minneapolis, Minn.) under the tradename Fluorad®. They may be used alone or in any combination. The specific surfactant(s) selected will vary with other components in the ink and the properties of the ink printed adjacent to it. It is important that the ionic character of the selected fluorinated surfactant be compatible with other components in the inks to avoid precipitation or flocculation. In one embodiment, the fluorinated surfactant should be non-ionic.

Some examples of suitable fluorinated surfactants are shown in the following table:

| R(f) | Q | A | n |
|---|---|---|---|
| F(CF$_2$CF$_3$)$_{3-8}$ | CH$_2$CH$_2$SCH$_2$CH$_2$ | CO$_2$Li (a) | 1 |
| F(CF$_2$CF$_2$)$_{3-8}$ | CH$_2$CH$_2$ | PO$_4$(NH$_4$)$_2$ (a) | 1 |
| F(CF$_2$CF$_3$)$_{3-8}$ | CH$_2$CH$_2$ | PO$_4$NH$_4$ (a) | 2 |
| F(CF$_2$CF$_3$)$_{3-8}$ | CH$_2$CH$_2$ | (OCH$_2$CH$_2$)$_x$OH (b) | 1 |

(a) Counter ions other than lithium and ammonium are also useful
(b) x is 1-10

The selected concentration will vary with the ink system, efficiency of the fluorinated surfactant, properties of companion ink(s), and the intended media. Generally, sufficient fluorinated surfactant will be added to provide adequate wetting of hydrophobic media surfaces. Preferred fluorinated surfactants include fluoroalkyl alcohol substituted monoether with polyethylene glycol, and telomer B monoether with polyethylene glycol.

Acetylenic diol surfactants are characterized by the 2-butyne-1,4-diol nucleus. The alcohol groups are optionally ethoxylated and the alkyne nucleus is further substituted with alkyl groups. An exemplary acetylenic diol surfactant is depicted by the following structure:

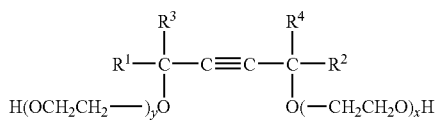

wherein R$^1$ are R$^2$ are independently branched or linear alkyls having 3 to 12 carbons, R$^3$ are R$^4$ are independently hydrogen or methyl, x and y are integers, and x+y is 0 to about 16.

Commercial examples include the Surfynol® and Dynol series of surfactants from Air Products (Allentown, Pa., USA). Preferred in some embodiments are Surfynol® 104 and Dynol™ 604, which are available as concentrated surfactant with substantially no solvent.

Surfynol® 104 can be depicted by the following structure:

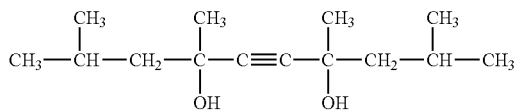

The mixture of surfactants is typically present in the amount of from about 2 wt % to about 6 wt %, and preferably from about 2.5 wt % to about 4.5 wt %, based on the total weight of the ink composition. The surfactants in the mixture are chosen such that the mixture provides sufficient wetting of hydrophobic surfaces.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in an ink is typically in the range of about 70% to about 99.8%, and preferably about 80% to about 98.0%, by weight based on total weight of the ink.

In a colored ink, colorant will generally be present in amounts up to about 12%, and more typically in the range of about 1% to about 9%, by weight based on total weight of the ink.

The amount of dispersant employed (or dispersant and synergist where used) will depend upon the choice and concentration of the pigment, and is typically based on the amount of colorant. Dispersants can be employed at a pigment-to-dispersant weight ratio in the range of about 1:3 to about 4:1. For organic pigments, the amount will usually be in the range of from about 15 to about 100% by weight, and preferably from about 20 to about 75% by weight, based on the weight of the pigment. For inorganic pigments, lower concentrations may be acceptable, e.g. about 5% or less.

Other ingredients (additives), when present, generally comprise less than about 15% by weight, based on the total weight of the ink.

When surfactants, defoamers, photoinitiators, photosynergists, stabilizers against deterioration by heat or light, deodorants, flow or slip aids, biocides and identifying tracers are used, these additives are individually present in amounts typically in a range of from about 0.01 wt % to about 6 wt %, based on the total weight of the ink.

Ink Properties

Jet velocity, separation length of the droplets, drop size, and stream stability are greatly affected by the surface tension and the viscosity of the ink. The surface tension will typically be in the range of about 15 dyne/cm to about 50 dyne/cm and more typically in the range 15 dyne/cm to about 35 dyne/cm. Viscosities are typically no greater than 30 cP, and more typically in the range of about 3.0 cP to about 20.0 cP at printhead operating temperature. The physical properties are compatible with a wide range of ejecting conditions, i.e., driving voltage, frequency and pulse width of ink jet printing device, and the shape and size of the nozzle. The inks have excellent storage stability for a long period and do not clog in an ink jet apparatus. They are useful with a variety of printheads, but are especially useful for piezo and similar printheads.

Ink Sets

The term "ink set" refers to all the individual fluids an inkjet printer is equipped to jet. For color printing an ink set will typically include at least a cyan, magenta and yellow ink. Commonly a black ink is also included. In addition to the typical CMY(K) inks, ink sets may further comprise one or more "gamut-expanding" inks, including different colored inks such as an orange ink, a green ink, a red ink, a violet ink and/or a blue ink, and combinations of full strength and light strengths inks such as light cyan and light magenta.

Substrates

The inks may be employed for printing on to a wide variety of substrates, both absorbent and non-absorbent including paper, glass, plastic and metal, e.g. steel, copper and aluminum, but are particularly suitable for printing on to plastics to provide a strongly bonded print of good definition and optical density. The plastic can, but need not, be pre-treated, for example by flame, plasma etch or corona treatment to raise the surface energy. Plastic substrate can be in the form of a film including but not limited to single and multi-layer constructions of acrylic-containing films, polyvinylchloride-containing films, (including vinyl, plasticized vinyl, reinforced vinyl, vinyl/acrylic blends), urethane-containing films, melamine-containing films, polyvinylfluoride-containing films and polyvinylbutyral-containing films.

Printing Method and Post Treatment

The inks of the present invention can be applied with any suitable printer, many of which are available commercially. Examples of commercial UV printers include those available from the following vendors: DuPont ("CromaPrint 22UV"), Vutek ("PressVu" series of printers), Durst ("Rho" series of printers), Nur ("Tempo"), Leggett & Platt ("Virtu" series of printers), and Sericol/Inca Digital ("Columbia", "Eagle" and "Spyder" series of printers). These printers include, or make available, suitable UV light sources to cure the printed inks.

EXAMPLES

The invention will now be further illustrated by, but not limited to, the following examples. Ingredient amounts are listed as weight percent of the total weight of concentrate or ink, unless otherwise noted. The chemical identity of commercial ingredients is as follows.

| Tradename or Abbreviation | Identity |
| --- | --- |
| [1]Solsperse ™ 39000 | Polymeric Dispersant |
| [1]Solsperse ™ 5000 | Pigmentary synergist |
| [1]Solsperse ™ 22000 | Pigmentary synergist |
| [2]Cinquasia RT 355-D | Magenta pigment (Complex of PV19 and PR202) |
| [3]Photomer ® 4361 | Ethoxylated (2)-1,6-hexanediol diacrylate, (2 moles average ethoxylation) |
| [4]SR 492 | Propoxylated trimethylolpropane triacrylate (3 moles average propoxylation) |
| [5]ODA-N | n-octyl acrylate, n-decyl acrylate mixture |
| [2]Irgacure ® 907 | 2-methyl-1-[4-(methylthio)phenyl]-2-(4-morpholinyl)-1-propanone |
| [2]Irgacure ® 369 | 2-Benzyl-2-(dimethylamino)-1-[4-(4-morpholinyl)phenyl]-1-butanone |
| [4]ITX | Isopropylthioxanthone |
| [4]EDB | Ethyl-p-N,N-dimethylamino benzoate |
| [6]Zonyl ® FSO-100 | Nonionic fluoro surfactant |
| [7]Dynol ™ 604 | Acetylenic diol surfactant |
| [7]Surfynol ® 104 | Acetylenic diol surfactant |
| [8]BYK ® 348 | Silicone surfactant |

[1]Noveon, Inc. (Charlotte, NC, USA).
[2]Ciba Specialty Chemicals (Newport, DE, USA).
[3]Cognis Corporation (Ambler, PA, USA).
[4]Sartomer Company (Exton, PA, USA).
[5]Cytec Industries Inc. (West Paterson, NJ, USA).
[6]E. I. du Pont de Nemours and Company (Wilmington, DE, USA).
[7]Air Products and Chemicals (Allentown, PA, USA).
[8]Byk Chemie USA (Wallingford, CT, USA).

Preparation of Dispersions

A black pigment dispersion concentrate was prepared according to the following procedure. A mixture was made containing 675 grams of Solsperse™ 39000 and 67.5 grams of Solsperse™ 5000; 2316.5 grams of Photomer® 4361; and 3.6 grams of 4-methoxyphenol. To the mixture was added, with stirring, 1312.5 grams of Pigment Black 7 to form a slurry. The slurry was processed in a high-speed disperser at 3000 RPM for 2 hours. The slurry was recovered and mixed with an additional 2187.5 grams of Photomer® 4361, which was used to rinse the disperser.

The slurry was charged to a Premier HM 1.5 bead mill and processed for 15 passes at about 2400 RPM. The mill contained 0.8 mm YTZ media and the process temperature was maintained between 75-130° F. at a flow rate of 0.5 pt/90 sec. During the last grinding pass, 937.5 grams of additional Photomer® 4361 was added. This yielded the final dispersion of black concentrate noted in the following table.

| Black dispersion concentrate | Weight % |
|---|---|
| Photomer ® 4361 | 72.55 |
| 4-methoxylphenol | 0.05 |
| Solsperse ™ 39000 | 9.00 |
| Solsperse ™ 5000 | 0.90 |
| Pigment Black 7 | 17.50 |

A yellow pigment dispersion having the following composition was prepared using a procedure similar to that described for the black concentrate.

| Yellow dispersion concentrate | Weight % |
|---|---|
| ODA-N | 71.35 |
| 4-methoxylphenol | 0.04 |
| Solsperse ™ 39000 | 10.00 |
| Solsperse ™ 22000 | 1.11 |
| Pigment Yellow 155 | 17.50 |

A magenta pigment dispersion having the following composition was prepared using a procedure similar to that described for the black concentrate.

| Magenta dispersion concentrate | Weight % |
|---|---|
| Photomer ® 4361 | 69.97 |
| 4-methoxylphenol | 0.03 |
| Solsperse ™ 39000 | 10.00 |
| Cinquasia RT 355-D | 20 |

A cyan pigment dispersion having the following composition was prepared using a procedure similar to that described for the black concentrate.

| Cyan dispersion concentrate | Weight % |
|---|---|
| Photomer ® 4361 | 69.97% |
| 4-methoxylphenol | 0.03% |
| Solsperse ™ 39000 | 10.00% |
| Pigment Blue 15:4 | 20% |

Preparation of Inks

The ink formulations in the examples were prepared by mixing together the appropriate pigment concentrate described above with appropriate vehicle and other components.

Adhesion Evaluation

Adhesion of cured samples was evaluated according to ASTM Method D3359. That method provides ratings of 5B-0B with the following definitions.

(5B) The edges of the cuts are completely smooth; none of the squares of the lattice are detached. Qualitatively, this is considered excellent adhesion.

(4B) Small flakes of the coating are detached at intersections; less than 5% of the area affected. Qualitatively, this is considered good adhesion.

(3B) Small flakes of the coating are detached along edges and at intersections of cuts. The area affected is 5-15% of the lattice. Qualitatively, this is considered fair adhesion.

(2B) The coating has flaked along the edges and on parts of the squares. The area affected is 15-35% of the lattice. Qualitatively, this is considered poor adhesion.

(1B) The coating has flaked along the edges of cuts in large ribbons and whole squares have detached. The area affected is 35-65% of the lattice. Qualitatively, this is considered poor adhesion.

(0B) Flaking and detachment worse than grade 1B. Qualitatively, this is considered poor adhesion.

From a practical standpoint, an adhesion rating of 5B or 4B is acceptable, a rating of 3B is marginal and probably unacceptable for most applications, and a rating of 2B or less is unacceptable.

Hardness Evaluation

Adhesion of cured samples was evaluated according to ASTM Method D3363. The hardness rating was determined as "pencil hardness" using a Gradco Pencil Scratch Hardness Kit HA-3363 with the following scale (softest to hardest): 6b, 5b, 4b, 3b, 2b, b, hb, f, h, 2h, 3h, 4h, 5h, 6h, 7h, 8h, 9h.

The relationship of the pencil hardness to practical utility is summarized in the following table. Preferably, the cured ink will have a pencil hardness rating of at least 6h.

| Pencil Hardness | Qualitative Rating | Film Description |
|---|---|---|
| 9h | Excellent | Very durable Film |
| 6h-8h | Good | Durable Film |
| 3h-5h | Fair | Soft film, unacceptable |
| 6b-2h | Poor | Very soft film, unacceptable |

Evaluation of Print Appearance

To evaluate appearance, a print was inspected under low (10×) magnification and with the unaided eye. The following rating scale was applied.

Poor—little ink coalescence, rough surface, much white space apparent giving a mottled appearance (undesirable image quality).

Fair—slightly improved ink coalescence and less surface roughness, but some white space apparent giving a mottled appearance (better but still undesirable image quality).

Good—even coverage, smooth surface, little or no white space apparent and little or no mottling evident (acceptable image quality).

Excellent—fully coalesced ink film, very smooth surface, no white space evident (very desirable image quality).

Viscosity

Viscosity was measured with a Brookfield Viscometer LVDV2+ using Spindle 00 and a UL Adapter with temperature control at 25° C. and at 35° C. Results are reported in cP.

Surface Tension

Surface tension was measured with a Kruss Surface Tensiometer (Wilhelmy Plate Method) at ambient temperature. Results are reported in dynes/cm.

Example 1

Inventive inks 1C, 1M, 1Y and 1K are prepared according to the formulation shown in the following table.

| Ingredient | Ink 1C | Ink 1M | Ink 1Y | Ink 1K |
| --- | --- | --- | --- | --- |
| Cyan dispersion | 10.0 | | | |
| Magenta dispersion | | 12.5 | | |
| Yellow dispersion | | | 11.4 | |
| Black dispersion | | | | 11.4 |
| ODA-N | 15.0 | 15.0 | 8.4 | 15.0 |
| Photomer ® 4361 | 56.0 | 53.5 | 61.2 | 54.6 |
| SR 492 | 10.0 | 10.0 | 10.0 | 10.0 |
| Irgacure ® 369 | 5.0 | 5.0 | 5.0 | 5.0 |
| ITX | 1.0 | 1.0 | 1.0 | 1.0 |
| EDB | 3.0 | 3.0 | 3.0 | 3.0 |

The following commercially available ink sets were used for comparison: Comm 1—UV-curable cyan, magenta, yellow and black inks sold under the tradename "UVIJET CI" (Sericol); Comm 2—UV curable, cyan, magenta, yellow and black sold under the tradename "LIOJET RCO3" (Toyo).

Samples were prepared from these inks by draw-down on Arlon flexible vinyl using a #6 Meyer rod.

Samples were cured in a Fusion UV Systems LC-6B Benchtop Conveyor using an LH-6 lamp with a D bulb and variable irradiance output. Exposure was controlled by conveyor speed through the curing zone. Energy output, measured in $mJ/cm^2$, was determined at a conveyor speed of 20 FPM (feet per minute) using a radiometer puck for UVA, UVB, UVC and UVV. The conveyor system had a digital readout of the system speed that was used to determine relative cure speeds and cure energies. Cure energies at higher or lower cure speeds were based on the calculated ratios of the energy outputs measured at 20 FPM.

Curing results are shown in the following tables.

| Sample | UVA Irr. (W/cm$^2$) | UVA Energy (mJ/cm$^2$) | Cure Speed (FPM) | Adhesion | Hardness |
| --- | --- | --- | --- | --- | --- |
| Ink 1C | 3.5 | 367 | 60 | 5b | 9h |
| Ink 1M | 3.5 | 400 | 60 | 5b | 9h |
| Ink 1Y | 3.6 | 480 | 50 | 5b | 9h |
| Ink 1K | 3.5 | 367 | 60 | 4b | 9h |
| Ink 1C | 1.6 | 350 | 40 | 5b | 9h |
| Ink 1M | 2.4 | 350 | 40 | 5b | 9h |
| Ink 1Y | 2.4 | 350 | 40 | 5b | 9h |
| Ink 1K | 2.4 | 280 | 50 | 4b | 9h |
| Ink 1C | 1.6 | 333 | 30 | 5b | 9h |
| Ink 1M | 1.5 | 333 | 30 | 5b | 9h |
| Ink 1Y | 1.6 | 333 | 30 | 5b | 9h |
| Ink 1K | 1.6 | 333 | 30 | 4b | 2h |

| Sample | UVA Irr. (W/cm$^2$) | UVA Energy (mJ/cm$^2$) | Cure Speed (FPM)* | Adhesion | Hardness |
| --- | --- | --- | --- | --- | --- |
| Comm 1 - Cyan | 3.14 | 973 | 20 | 1b | 9h |
| Comm 1 - Magenta | 3.14 | 973 | 20 | 0b | 9h |
| Comm 1 - Yellow | 3.14 | 973 | 20 | 0b | 9h |
| Comm 1 - Black | 3.14 | 973 | 20 | 0b | 9h |
| Comm 1 - Cyan | 2.45 | 1224 | 25 (2x) | 0b | 9h |
| Comm 1 - Magenta | 2.45 | 1224 | 25 (2x) | 0b | 9h |
| Comm 1 - Yellow | 2.45 | 1224 | 25 (2x) | 0b | 9h |
| Comm 1 - Black | 2.45 | 1224 | 25 (2x) | 0b | 9h |
| Comm 1 - Cyan | 1.91 | 952 | 12 | 0b | 9h |
| Comm 1 - Magenta | 1.91 | 952 | 12 | 0b | 9h |
| Comm 1 - Yellow | 1.91 | 952 | 12 | 0b | 9h |
| Comm 1 - Black | 1.91 | 952 | 12 | 0b | 9h |
| Comm 1 - Cyan | 1.26 | 1307 | 12 (2x) | 4b | 9h |
| Comm 1 - Magenta | 1.26 | 1307 | 12 (2x) | 3b | 9h |
| Comm 1 - Yellow | 1.26 | 1307 | 12 (2x) | 1b | 9h |
| Comm 1 - Black | 1.26 | 1307 | 12 (2x) | 1b | 9h |

*(2x) means two passes at the indicated speed

| Sample | UVA Irr. (W/cm$^2$) | UVA Energy (mJ/cm$^2$) | Cure Speed (FPM) | Adhesion | Hardness |
| --- | --- | --- | --- | --- | --- |
| Comm 2 - Black | 3.56 | 662 | 35 | 1b | 9h |
| Comm 2 - cyan | 3.68 | 773 | 30 | 0b | 9h |
| Comm 2 - Magenta | 3.68 | 14 | 80 | 3b | 9h |
| Comm 2 - Yellow | 3.68 | 387 | 60 | 0b | 9h |
| Comm 2 - Black | 2.465 | 987 | 15 | 4b | 9h |
| Comm 2 - cyan | 2.464 | 987 | 15 | 3b | 9h |
| Comm 2 - Magenta | 2.464 | 37 | 40 | 4b | 9h |
| Comm 2 - Yellow | 2.464 | 1480 | 10 | 1b | 9h |

The inventive inks cure rapidly and provide good-excellent adhesion (indicative of good "through-cure") and excellent hardness (indicative of good "surface-cure"). Furthermore, the curing energy for all four colors in the inventive ink set are approximately the same at each irradiance level. It thus requires the same approximate curing energy for all the irradiances shown (e.g. about 2.4 and 1.6 W/cm$^2$). This illustrates no problem with reciprocity.

Competitive inks 1 and 2 show poor adhesion (indicative of poor through-cure) although have excellent hardness. Furthermore, a wide difference in curing energy at various irradiances for both sets of inks illustrating a severe reciprocity failure. In addition, for Comparative ink set 2 there is a wide difference in curing energy even at one irradiance level.

The inventive inks are advantageous, relative to the comparative inks, in adhesion/through-cure and reciprocity.

Example 2

Inks 2a-2f with varying levels and ratios of fluoro surfactant (Zonyl® FSO-100) and acetylene diol surfactant (Surfynol® 104), as shown in the following table, were prepared and jetted with a CromaPrint 22UV (E. I. du Pont de Nemours and Company, Wilmington, Del., USA). The printhead was heated to about 40° C., the drop size was about 30 ng, the print mode was 600 by 800 dpi, and the pattern was a solid block at 100% coverage. The substrates were PVC (polyvinyl chloride) board, adhesive backed vinyl film (Avery Corp.) and polycarbonate sheet.

Results showed that the prescribed surfactant blend provided good to excellent appearance across the range of substrates tested. In this formulation, it was most advantageous for the fluoro surfactant to be present at levels of at least about 1.5 wt %, and the acetyleneic diol to be present at levels of at least about 0.5 wt %.

In actual practice, the ratio and level of surfactant needed for optimum performance may vary depending on the particular formulation. Routine experimentation will reveal the most appropriate levels. In some cases, surfactant levels in substantial excess of what is needed for proper spreading can be detrimental to image quality and durability.

The pigment and dispersant in each case was the cyan pigment and dispersant from the cyan dispersion concentrate above. The Ink 2f formulation was also used to prepare magenta, yellow and black inks using the magenta, yellow and black concentrates above in place of the cyan. Similar excellent appearance was obtained for these other colors as well.

|  | Ink 2a | Ink 2b | Ink 2c | Ink 2d | Ink 2e | Ink 2f |
|---|---|---|---|---|---|---|
| Ingredients |  |  |  |  |  |  |
| Cyan Pigment | 2.0 | 2.0 | 2.0 | 2.0 | 2.0 | 2.0 |
| Solsperse ™ 39000 | 1.0 | 1.0 | 1.0 | 1.0 | 1.0 | 1.0 |
| Photomer ® 4361 | 61.5 | 61.0 | 60.5 | 61.0 | 60.5 | 60.0 |
| ODA-N | 15.0 | 15.0 | 15.0 | 15.0 | 15.0 | 15.0 |
| SR 492 | 10.0 | 10.0 | 10.0 | 10.0 | 10.0 | 10.0 |
| Irgacure ® 369 | 5.0 | 5.0 | 5.0 | 5.0 | 5.0 | 5.0 |
| EDB | 3.0 | 3.0 | 3.0 | 3.0 | 3.0 | 3.0 |
| ITX | 1.0 | 1.0 | 1.0 | 1.0 | 1.0 | 1.0 |
| Zonyl ® FSO-100 | 1.0 | 1.5 | 2.0 | 1.0 | 1.5 | 2.0 |
| Surfynol ® 104 | 0.5 | 0.5 | 0.5 | 1.0 | 1.0 | 1.0 |
| Physical Properties |  |  |  |  |  |  |
| Surface tension | 27.4 | 23.5 | 23.1 | 25.6 | 23.4 | 22.8 |
| Viscosity 30 rpm@35° C. | 13.4 | 13.2 | 13.5 | 13.7 | 13.1 | 13.4 |
| Appearance |  |  |  |  |  |  |
| PVC Board | Fair | Good | Good | Good | Good | Excellent |
| Avery Vinyl | Fair | Fair | Fair | Fair | Good | Excellent |
| Polycarbonate | Excellent | Excellent | Excellent | Excellent | Excellent | Excellent |

Example 3

Inks 3a-3c, shown in the following table, were prepared and printed in the same manner as the previous example. This demonstrated that the use of a different acetylenic diol surfactant (Dynol™ 604) in combination with a fluoro surfactant also gave good results over a range of substrates.

|  | Ink 3a | Ink 3b | Ink 3c |
|---|---|---|---|
| Ingredients |  |  |  |
| Cyan Pigment | 2.0 | 2.0 | 2.0 |
| Solsperse ™ 39000 | 1.0 | 1.0 | 1.0 |
| Photomer ® 4361 | 61.0 | 60.5 | 60.0 |
| ODA-N | 15.0 | 15.0 | 15.0 |
| SR 492 | 10.0 | 10.0 | 10.0 |
| Irgacure ® 369 | 5.0 | 5.0 | 5.0 |
| EDB | 3.0 | 3.0 | 3.0 |
| ITX | 1.0 | 1.0 | 1.0 |
| Zonyl ® FSO-100 | 1.0 | 1.5 | 2.0 |
| Dynol ™ 604 | 1.0 | 1.0 | 1.0 |
| Physical Properties |  |  |  |
| Surface tension | 26.22 | 25.59 | 23.83 |
| Viscosity 30 rpm@35° C. | 13.6 | 13.4 | 13.5 |
| Appearance |  |  |  |
| PVC Board | Poor | Fair | Good |
| Avery Vinyl | Poor | Fair | Good |
| Polycarbonate | Fair | Good | Excellent |

Example 4

Comparative

Comparative inks 4a-4d, shown in the following table, were prepared and printed in the same manner as Example 2. Inks with fluro (4a), acetylenic diol (4b) and silicone (4c) surfactant alone do not provide good appearance across the range of substrates tested. Likewise, a mixture of fluoro and silicone surfactant (4d) was not effective, and neither was the commercial UVIJET ink sample (Comm 1 cyan).

|  | Ink 4a (comp.) | Ink 4b (comp.) | Ink 4c (comp.) | Ink 4d (comp.) | Comm 1 cyan |
| --- | --- | --- | --- | --- | --- |
| Ingredients |  |  |  |  |  |
| Cyan Pigment | 2.0 | 2.0 | 2.0 | 2.0 |  |
| Solsperse ™ 39000 | 1.0 | 1.0 | 1.0 | 1.0 |  |
| Photomer ® 4361 | 61.0 | 62.5 | 62.0 | 60.0 |  |
| ODA-N | 15.0 | 15.0 | 15.0 | 15.0 |  |
| SR 492 | 10.0 | 10.0 | 10.0 | 10.0 |  |
| Irgacure ® 369 | 5.0 | 5.0 | 5.0 | 5.0 |  |
| EDB | 3.0 | 3.0 | 3.0 | 3.0 |  |
| ITX | 1.0 | 1.0 | 1.0 | 1.0 |  |
| Zonyl ® FSO-100 | 2.0 | — | 0.0 | 2.0 |  |
| BYK ® 348 | — | 0.5 | — | 1.0 |  |
| Surfynol ® 104 | — | — | 1.0 | — |  |
| Physical Properties |  |  |  |  |  |
| Surface tension | 24.3 | 33.4 | 33.23 | 23.0 | 24.8 |
| Viscosity 30 rpm@35° C. | 13.1 | 12.8 | 13.5 | 12.9 | 15.4 |
| Appearance |  |  |  |  |  |
| PVC Board | Poor | Poor | Poor | Excellent | Poor |
| Avery Vinyl | Poor | Poor | Poor | Poor | N/a |
| Polycarbonate | Excellent | Excellent | Excellent | good | Poor |

The invention claimed is:

1. A radiation curable inkjet ink composition comprising a polymerizable vehicle and at least one additional ingredient selected from the group consisting of a colorant, a photosensitizer, a photosynergist, a photoinitiator and a surfactant, wherein said polymerizable vehicle comprises a mixture of monofunctional and multifunctional monomers comprising:
   a linear alkyl acrylate selected from group consisting of n-octyl acrylate, n-nonyl acrylate, n-decyl acrylate and combinations thereof;
   an ethoxylated 1,6-hexanediol diacrylate; and
   a propoxylated trimethylolpropane triacrylate.

2. The radiation curable inkjet ink composition of clam 1, wherein the linear alkyl acrylate is present in an amount of between about boo and about 18% by weight based on the total weight of the ink; the ethoxylated 1,6-hexanediol diacrylate is present in an amount of between about 55% and about 67% by weight based on the total weight of the ink; and the propoxylated trimethylolpropane triacrylate is present in an amount of between about 7% and 13% by weight based on the total weight of the ink.

3. The radiation curable inkjet ink composition of claim 2, wherein the ethoxylated 1,6-hexanediol diacrylate is of the formula:

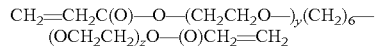

wherein y and z are integers, and the moles of ethoxylation (y+z) per molecule is on average between about one and about three.

4. The radiation curable inkjet ink composition of claim 3, wherein the propoxylated trimethylolpropane triacrylate is of the formula:

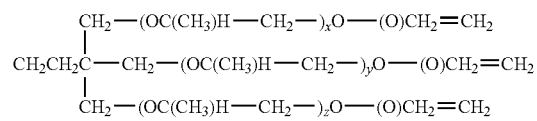

wherein x, y and z are integers, and the moles of propoxylation (x+y+z) per molecule is on average between about two and about four.

5. The radiation curable inkjet ink composition of claim 1, wherein the photosensitizer is isopropyl thioxanthone; the photosynergist is ethyl-4-(dimethylamino)benzoate; and the photoinitiator is one or both of 2-methyl-1-[4-methylthio)phenyl]-2-(4-morpholinyl)-1-propanone and 2-benzyl-2-(dimethylamino)-1-[4-(4-morpholinyl)phenyl]-1-butanone.

6. The radiation curable inkjet ink composition of claim 1, further comprising a pigment colorant stably dispersed in the polymerizable vehicle.

7. The radiation curable inkjet ink composition of claim 1 wherein the surfactant is comprised of a mixture of at least one fluorinated surfactant and at least one acetylenic diol surfactant.

8. The radiation curable inkjet ink composition of any one of the previous claims, wherein the polymerizable vehicle is substantially free of nonpolymerizable solvents.

9. A method for ink jet printing onto a substrate, comprising the steps of:
   (a) providing an ink jet printer that is responsive to digital data signals;
   (b) loading the printer with a substrate to be printed;
   (c) loading the printer with the radiation curable inkjet ink as set forth in claim 1, alone or in an ink set; and (d) printing onto the substrate using said inkjet ink or inkjet ink set, in response to the digital data signals, and forming thereby a printed article.

10. The method of claim 9, wherein the substrate is selected from the group consisting of polycarbonate, polyvinyl chloride board, pressure sensitive adhesive-backed vinyl, polystyrene, foam boards and plywood.

11. The method of claim 9 or claim 10, further comprising the step of exposing the printed article to radiation suitable for curing the ink printed thereon.

12. The method of claim 11, wherein the radiation is ultraviolet light.

* * * * *